(12) United States Patent
Yaney et al.

(10) Patent No.: US 8,077,049 B2
(45) Date of Patent: *Dec. 13, 2011

(54) METHOD AND APPARATUS FOR COMMUNICATING POWER DISTRIBUTION EVENT AND LOCATION

(75) Inventors: David S. Yaney, Poolesville, MD (US); Robert D. Kehn, Myersville, MD (US)

(73) Assignee: Current Technologies, LLC, Germantown, MD (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/354,225

(22) Filed: Jan. 15, 2009

(65) Prior Publication Data

US 2009/0187285 A1    Jul. 23, 2009

Related U.S. Application Data

(60) Provisional application No. 61/022,462, filed on Jan. 21, 2008, provisional application No. 61/022,348, filed on Jan. 20, 2008.

(51) Int. Cl.
*G08B 21/00* (2006.01)
*H04M 11/04* (2006.01)
*G08B 29/00* (2006.01)

(52) U.S. Cl. ........ 340/660; 340/661; 340/663; 340/538; 340/511; 700/293

(58) Field of Classification Search .................... 340/660
See application file for complete search history.

(56) References Cited

U.S. PATENT DOCUMENTS

| | | |
|---|---|---|
| 3,967,264 A | 6/1976 | Whyte et al. |
| 4,570,231 A | 2/1986 | Bunch |
| 4,635,055 A | 1/1987 | Fernandes et al. |
| 4,758,962 A | 7/1988 | Fernandes |

(Continued)

FOREIGN PATENT DOCUMENTS

EP    1 253 699 A2    10/2002

OTHER PUBLICATIONS

"Centralized Commercial Building Applications with the Lonworks ® PLT-21 Power Line Transceiver", *Lonworks Engineering Bulletin*, Echelon, (Apr. 1997), 1-22.

(Continued)

*Primary Examiner* — Donnie Crosland
(74) *Attorney, Agent, or Firm* — Mel Barnes; Capital Legal Group, PLLC

(57) ABSTRACT

A system, device, and method of providing information for a power distribution system is provided. In one embodiment, a method of using a device that receives power from the low voltage power of the power distribution system and experiences a power loss during a local power outage may perform the processes of monitoring a voltage of the low voltage power line, detecting a voltage reduction below a threshold voltage for a predetermined time period, storing information of the voltage reduction in a non-volatile memory prior to the power outage, and transmitting a notification to a remote computer system prior to the outage. The monitoring may comprise making a plurality of measurements of the voltage during a time interval and averaging the plurality of voltage measurements. In addition, the method may include transmitting an alert message upon power up after the outage to indicate a power restoration local to the device.

25 Claims, 7 Drawing Sheets

U.S. PATENT DOCUMENTS

| | | |
|---|---|---|
| 5,006,846 A | 4/1991 | Granville et al. |
| 5,341,265 A | 8/1994 | Westrom et al. |
| 5,369,356 A | 11/1994 | Kinney et al. |
| 5,414,400 A | 5/1995 | Gris et al. |
| 5,498,956 A | 3/1996 | Kinney et al. |
| 5,568,399 A | 10/1996 | Sumic |
| 5,760,492 A | 6/1998 | Kanoi et al. |
| 5,777,545 A | 7/1998 | Patel |
| 6,072,858 A | 6/2000 | Bellin |
| 6,151,330 A | 11/2000 | Liberman |
| 6,675,071 B1* | 1/2004 | Griffin et al. ............... 700/286 |
| 6,687,574 B2 | 2/2004 | Pietrowicz et al. |
| 6,771,078 B1 | 8/2004 | McCauley et al. |
| 6,822,457 B2 | 11/2004 | Borchert et al. |
| 6,828,770 B1 | 12/2004 | McCauley et al. |
| 6,917,888 B2 | 7/2005 | Logvinov et al. |
| 7,069,117 B2 | 6/2006 | Wilson et al. |
| 7,089,125 B2 | 8/2006 | Sonderegger |
| 7,626,489 B2* | 12/2009 | Berkman et al. ............ 340/12.32 |
| 2001/0013771 A1 | 8/2001 | Wasmer |
| 2001/0052843 A1 | 12/2001 | Wiesman et al. |
| 2002/0000802 A1 | 1/2002 | Panto et al. |
| 2002/0053912 A1 | 5/2002 | Saha et al. |
| 2002/0064010 A1 | 5/2002 | Nelson et al. |
| 2002/0067171 A1 | 6/2002 | Lanan |
| 2002/0089802 A1 | 7/2002 | Beckwith |
| 2003/0052694 A1 | 3/2003 | Dindis et al. |
| 2003/0067725 A1 | 4/2003 | Horvath et al. |
| 2003/0105608 A1 | 6/2003 | Hart |
| 2003/0137388 A1 | 7/2003 | Meier et al. |
| 2003/0171884 A1 | 9/2003 | Ennis et al. |
| 2004/0008461 A1 | 1/2004 | Kojovic et al. |
| 2004/0021455 A1 | 2/2004 | Staats |
| 2004/0027748 A1 | 2/2004 | Kojovie et al. |
| 2004/0036478 A1 | 2/2004 | Logvinov et al. |
| 2004/0061616 A1 | 4/2004 | Fischer et al. |
| 2004/0153215 A1 | 8/2004 | Kearney et al. |
| 2004/0160227 A1 | 8/2004 | Piesinger |
| 2004/0183522 A1 | 9/2004 | Gunn et al. |
| 2004/0189317 A1 | 9/2004 | Borchert et al. |
| 2004/0212512 A1 | 10/2004 | Stewart |
| 2004/0245994 A1 | 12/2004 | Schlapp et al. |
| 2005/0040809 A1 | 2/2005 | Uber, III et al. |
| 2005/0057227 A1 | 3/2005 | Rockwell |
| 2005/0083206 A1 | 4/2005 | Couch et al. |
| 2005/0141682 A1 | 6/2005 | Wells |
| 2006/0007016 A1 | 1/2006 | Borkowski et al. |
| 2006/0036795 A1 | 2/2006 | Leach |
| 2006/0060007 A1 | 3/2006 | Mekhanoshin et al. |
| 2006/0076946 A1 | 4/2006 | Shvach et al. |
| 2006/0084419 A1* | 4/2006 | Rocamora et al. |
| 2006/0087777 A1* | 4/2006 | Bruno |
| 2006/0106554 A1 | 5/2006 | Borkowski et al. |
| 2006/0119344 A1* | 6/2006 | Benke et al. |
| 2006/0119368 A1* | 6/2006 | Sela et al. |
| 2006/0171085 A1* | 8/2006 | Keating |
| 2006/0176631 A1* | 8/2006 | Cannon |
| 2006/0181284 A1* | 8/2006 | Fraedrich |
| 2006/0187074 A1* | 8/2006 | O'Sullivan et al. |
| 2006/0192672 A1* | 8/2006 | Gidge et al. |
| 2006/0195229 A1* | 8/2006 | Bell et al. |
| 2006/0217058 A1* | 9/2006 | Staszesky et al. |
| 2006/0241880 A1* | 10/2006 | Forth et al. |
| 2006/0271313 A1* | 11/2006 | Mollenkopf |
| 2006/0284647 A1* | 12/2006 | Gunn et al. |
| 2007/0014059 A1* | 1/2007 | Altonen et al. |
| 2007/0014313 A1* | 1/2007 | Bickel et al. |
| 2007/0024264 A1 | 2/2007 | Lestician |
| 2007/0086140 A1* | 4/2007 | Swartzendruber et al. |
| 2007/0090811 A1* | 4/2007 | Labuschagne |
| 2007/0136010 A1 | 6/2007 | Gunn et al. |
| 2007/0156358 A1* | 7/2007 | Saha et al. |
| 2007/0179721 A1* | 8/2007 | Yaney |
| 2007/0179726 A1* | 8/2007 | Bickel |
| 2007/0185665 A1* | 8/2007 | Roytelman |
| 2007/0203658 A1* | 8/2007 | Pater |
| 2007/0211401 A1* | 9/2007 | Mak |
| 2007/0213879 A1* | 9/2007 | Iwamura |
| 2007/0217105 A1* | 9/2007 | Christensen et al. |
| 2007/0219755 A1* | 9/2007 | Williams et al. |
| 2007/0229295 A1* | 10/2007 | Curt et al. |
| 2007/0258175 A1 | 11/2007 | Montgomery et al. |
| 2007/0285079 A1 | 12/2007 | Nasle |
| 2008/0007416 A1 | 1/2008 | Cern |
| 2008/0048668 A1 | 2/2008 | Mashikian |
| 2008/0065342 A1 | 3/2008 | Zalitzky et al. |
| 2008/0077336 A1 | 3/2008 | Fernandes |
| 2008/0097706 A1 | 4/2008 | McCormack et al. |
| 2008/0106832 A1 | 5/2008 | Restrepo et al. |
| 2008/0122642 A1 | 5/2008 | Radtke et al. |
| 2008/0167827 A1 | 7/2008 | McAllister et al. |
| 2008/0204054 A1 | 8/2008 | Wells |
| 2009/0085407 A1 | 4/2009 | Venkatasubramanian |
| 2009/0099798 A1 | 4/2009 | Gong et al. |
| 2009/0115254 A1 | 5/2009 | Dawley |
| 2009/0184835 A1* | 7/2009 | Deaver et al. ............... 340/660 |
| 2009/0187284 A1 | 7/2009 | Kreiss et al. |
| 2009/0187285 A1 | 7/2009 | Yaney et al. |
| 2009/0187344 A1 | 7/2009 | Brancaccio et al. |
| 2009/0189594 A1 | 7/2009 | Cern |
| 2009/0228154 A1 | 9/2009 | Trias |
| 2009/0276170 A1 | 11/2009 | Bickel |
| 2010/0010761 A1 | 1/2010 | Nordebo et al. |
| 2010/0085036 A1 | 4/2010 | Banting et al. |
| 2010/0179779 A1 | 7/2010 | Taft |
| 2010/0179780 A1 | 7/2010 | Taft |

OTHER PUBLICATIONS

"Outlook Conference 2004: Amperion Deployment Overview", *Primen Conference*, (May 7, 2004), 1-10.

* cited by examiner

METHOD AND APPARATUS FOR COMMUNICATING POWER DISTRIBUTION EVENT AND LOCATION

CROSS REFERENCE TO RELATED APPLICATIONS

This application claims the benefit of U.S. Provisional Application No. 61/022,462, filed Jan. 21, 2008; and U.S. Provisional Application No. 61/022,348, filed Jan. 20, 2008; both of which are incorporated herein by reference in their entirety for all purposes.

FIELD OF THE INVENTION

The present invention generally relates to methods and apparatus for communicating notifications of power grid events, and more particularly to systems, methods and devices for communicating notifications pertaining to a power grid event, such as a power fault or imminent power outage.

BACKGROUND OF THE INVENTION

Electrical power for consumption at residences, offices and other structures is delivered by a power distribution system. A power distribution system may include numerous sections, which transmit power at different voltages. A section of high voltage power transmission lines forms a power distribution grid for transmitting power from a power plant to substations near populated areas. Various medium voltage (MV) power sections are coupled to the grid via substations to serve specific regions. An MV power section includes medium voltage power lines carrying power having a voltage in the range of 1,000V to 100,000V. Low voltage (LV) power sections are coupled to the MV power lines via distribution transformers to serve specific groups of structures such as homes. In the United States, the LV power lines typically carry voltages of approximately 120V phase to ground and 240V phase to phase.

The power distribution system includes transformers, switching devices, other devices, and miles of power lines. Maintaining the system in effective working order is imperative for the consumer and society. Maintenance is used to identify signs of potential failure and better manage distribution and redistribution of power to satisfy local needs. Even with such maintenance, however, faults occasionally occur, which typically results in a power outage thereby preventing power delivery. Power outages also may occur due to other events, such as when inclement weather conditions or falling tree branches knock down power lines. It is desirable that the utility operator quickly identify and respond to such power distribution events to minimize the adverse impact to the power distribution system and to the consumers. In particular, it is desirable to determine what adverse power distribution event may occur (or has occurred) and the location of such an event.

Accordingly, there is a need to collect power distribution parameter data for use in identifying adverse power distribution events. Another need is to obtain sufficient data to locate and respond to the power distribution event. Various embodiments of the present invention may satisfy one or more of these needs or others.

SUMMARY OF THE INVENTION

The present invention provides a system, device, and method of providing information for a power distribution system. In one embodiment, a method of using a device that receives power from the low voltage power of the power distribution system and experiences a power loss during a local power outage may perform the processes of monitoring a voltage of the low voltage power line, detecting a voltage reduction below a threshold voltage for a predetermined time period, storing information of the voltage reduction in a non-volatile memory prior to the power outage, and transmitting a notification to a remote computer system prior to the outage. The monitoring may comprise making a plurality of measurements of the voltage during a time interval and averaging the plurality of voltage measurements. In addition, the method may include transmitting an alert message upon power up after the outage to indicate a power restoration local to the device.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
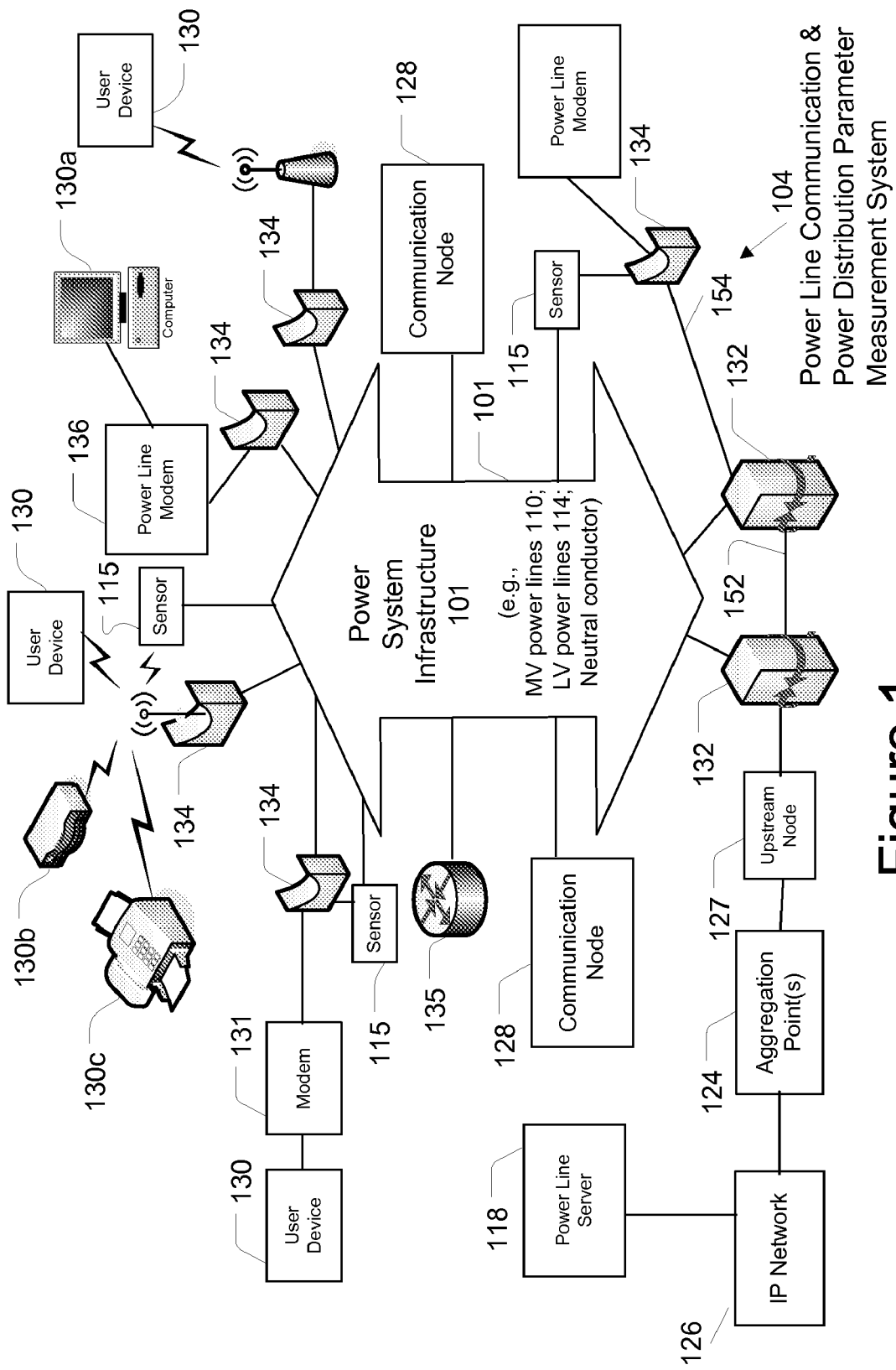
FIG. 1 is a block diagram of an example power line communication and power distribution parameter measurement system.

In the following description, for purposes of explanation and not limitation, specific details are set forth, such as particular networks, communication systems, computers, terminals, devices, components, techniques, data and network protocols, power line communication systems (PLCSs), software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, PLCSs, components, techniques, data and network protocols, software products and systems, operating systems, development interfaces, and hardware are omitted so as not to obscure the description of the present invention.

Following is a description of example embodiments of a power line communication system that includes a power line parameter measurement system. The PLCS may include power line parameter sensor devices, various communication devices, communication protocols, and implementation software. Also described are exemplary network topologies. Such systems and devices may be implemented in various embodiments according to the present invention to detect and locate the sources of power distribution events. According to various embodiments, the power line communication devices and sensor devices may be located throughout the power distribution system to obtain, process, and communicate power line parameter data.

As discussed, a power distribution event may comprise a power line fault or a power outage. These events sometimes may be preceded by an abnormal current draw (and/or other change in parameter(s) such as a voltage dip) that may signal, for example, an imminent fault or outage. The power line communication equipment described herein may be configured to process power line parameter data collected from one or more sensor devices to determine if the characteristics of the parameter indicate the presence of an event or an imminent event and if so, to provide a notification of such an event and location data thereof.

Power Line Communication and Sensor System

The power line communication and sensor system of the present invention may gather power distribution parameter data from multiple points along a power distribution network and transmit the gathered data to a utility operator or other processing center. For example, sensor devices may be positioned along overhead and underground medium voltage power lines, and along (external and/or internal) low voltage power lines. As discussed, the power line parameter data may be used to detect an existing or imminent fault or power outage (imminent in that the outage or fault is likely to occur within ten seconds, more preferably within five seconds, and still more preferably within two seconds).

The power line communication portion of the system also may provide user communication services, such as high speed broadband internet access, mobile telephone communications, other broadband communications, digital television, VoIP telephone service, streaming video and audio services, and other communication services to homes, buildings and other structures, and to each room, office, apartment, or other unit or sub-unit of multi-unit structures. Communication services also may be provided to mobile and stationary devices in outdoor areas such as customer premises yards, parks, stadiums, and also to public and semi-public indoor areas such as subway trains, subway stations, train stations, airports, restaurants, public and private automobiles, bodies of water (e.g., rivers, bays, inlets, etc.), building lobbies, elevators, etc.

In some embodiments, a power line parameter sensor device, which includes a sensor for measuring a parameter, is installed at one or more communication nodes to measure power line parameters of various regions, neighborhoods and structures. The power parameter sensor device may measure (meant to include measure or detect) one or more electrical distribution parameters, which may include, for example purposes only, power usage, power line voltage, power line current, detection of a power outage, detection of water in a pad mount, detection of an open pad mount, detection of a street light failure, power delivered to a transformer, power factor (e.g., the phase angle between the voltage and current of a power line), power delivered to a downstream branch, power line temperature, data of the harmonic components of a power signal, load transients, and/or load distribution. One skilled in the art will appreciate that other types of parameter data also may be measured or detected. The data may be processed by the nearby node and/or communicating to a remote device (e.g., the utility operator) for processing.

FIG. 1 shows components of a power line communication system that may be used to also provide a power distribution parameter measurement system. The system 104 includes a plurality of communication nodes 128 which form communication links using power lines 110, 114 and other communication media. Various user devices 130 and power line communication devices may transmit and receive data over the links to communicate over an IP network 126 (e.g., the Internet). Thus, the communicated data may include measurement data of power distribution parameters, control data and user data. Communication nodes 128 may be any of a backhaul node 132, an access node 134, or a repeater node 135. A given node 128 may serve as a backhaul node 132, access node 134, and/or repeater node 135.

A communication link may be formed between two communication nodes 128 over a communication medium. Some links may be formed over MV power lines 110 and others over LV power lines 114. Other links may be gigabit-Ethernet links 152, 154 formed, for example, via a fiber optic cable. Thus, some links may be formed using a portion 101 of the power system infrastructure, while other links may be formed over another communication media, (e.g., a coaxial cable, a T-1 line, a fiber optic cable, wirelessly (e.g., IEEE 802.11 a/b/g, 802.16, 1G, 2G, 3G, or satellite such as WildBlue®)). The links formed by wired or wireless media may occur at any point along a communication path between an end device and the internet (or other device).

Each communication node 128 may be formed by one or more communication devices. Communication nodes which communicate over a power line medium include a power line communication device. Exemplary power line communication devices include a backhaul device 138, an access device 139, and a power line repeater 135. Communication nodes 128 which communicate wirelessly may include a mobile telephone cell site, a WiMAX cell site, or a wireless access point having at least a wireless transceiver. Communication nodes which communicate over a coaxial cable may include a cable modem or other modem. Communication nodes which communicate over a twisted pair wire may include a DSL modem or other modem. A given communication node typically will communicate in two directions (either full duplex or half duplex), which may be over the same or different types of communication media. Accordingly, a communication node 128 may include one, two or more communication devices.

A backhaul node 132 may serve as an interface between a power line medium (e.g., an MV power line 110) and an upstream node 127, which may be, for example, connected to an aggregation point 124 that may provide a connection to an IP network 126 such as the internet. The system 104 typically includes one or more backhaul nodes 132. Upstream communications from user premises, as well as control messages from power line communication devices may be communicated to an access node 134, to a backhaul node 132, and then transmitted to an aggregation point 124 which is communicatively coupled to the IP network 126. Communications may traverse the IP network to a destination, such as a web server, power line server 118, or another end user device. The backhaul node 132 may be coupled to the aggregation point 124 directly or indirectly (i.e., via one or more intermediate nodes 127). The backhaul node 132 may communicate with its upstream device via any of several alternative communication media, such as a fiber optic cable (digital or analog (e.g., Wave Division Multiplexed)), coaxial cable, WiMAX, IEEE 802.11, twisted pair and/or another wired or wireless media. Downstream communications from the IP network 126 typically are communicated through the aggregation point 124 to the backhaul node 132. The aggregation point 124 typically includes an Internet Protocol (IP) network data packet router and is connected to an IP network backbone, thereby providing access to an IP network 126 (i.e., can be connected to or form part of a point of presence or POP). Any available mechanism may be used to link the aggregation point 124 to the POP or other device (e.g., fiber optic conductors, T-carrier, Synchronous Optical Network (SONET), and wireless techniques).

An access node 134 may transmit data to, and receive data from, one or more user devices 130 or other network destinations. Other data, such as power line parameter data (e.g., current measured by a power line current sensor) may be received by an access node's power line communication device 139. The data typically enters the system 104 along a communication medium coupled to the access node 134. The data is routed through the system 104 to a backhaul node 132. Downstream data is sent through the network to a user device 130. Exemplary user devices 130 include a computer 130a, LAN, a WLAN, router 130b, Voice-over IP endpoint, game system, personal digital assistant (PDA), mobile telephone, digital cable box, security system, alarm system (e.g., fire, smoke, carbon dioxide, security/burglar, etc.), stereo system, television, fax machine 130c, HomePlug residential network, or other user device having a data interface. The system also may be used to communicate utility usage data from an automated gas, water, and/or electric power meter. A user device 130 may include or be coupled to a modem to communicate with a given access node 134. Exemplary modems include a power line modem 136, a wireless modem 131, a cable modem, a DSL modem or other suitable modem or transceiver for communicating with its access node 134.

A repeater node 135 may receive and re-transmit data (i.e., repeat the data), for example, to extend the communications range of other communication elements. As a communication traverses the communication network 104, backhaul nodes 132 and access nodes 134 also may serve as repeater nodes 135, (e.g., for other access nodes and other backhaul nodes 132). Repeaters may also be stand-alone devices without additional functionality. Repeaters 135 may be coupled to and repeat data on MV power lines or LV power lines (and, for the latter, be coupled to the internal or external LV power lines).

Backhaul Device 138:

As discussed, communication nodes, such as access nodes, repeaters, and other backhaul nodes, may communicate to and from the IP network (which may include the Internet) via a backhaul node 132. In one example embodiment, a backhaul node 132 comprises a backhaul device 138. The backhaul device 138, for example, may transmit communications directly to an aggregation point 124, or to a distribution point 127 which in turn transmits the data to an aggregation point 124.

Figure 2:
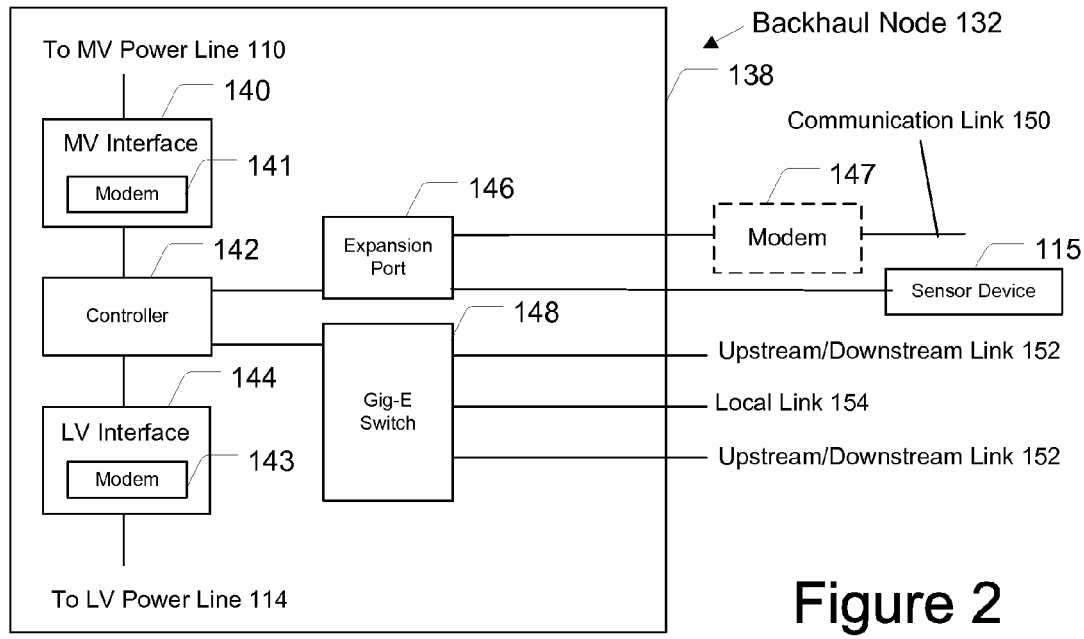
FIG. 2 is a block diagram of an example embodiment of a backhaul node and sensor device according to the present invention.
Figure 3:
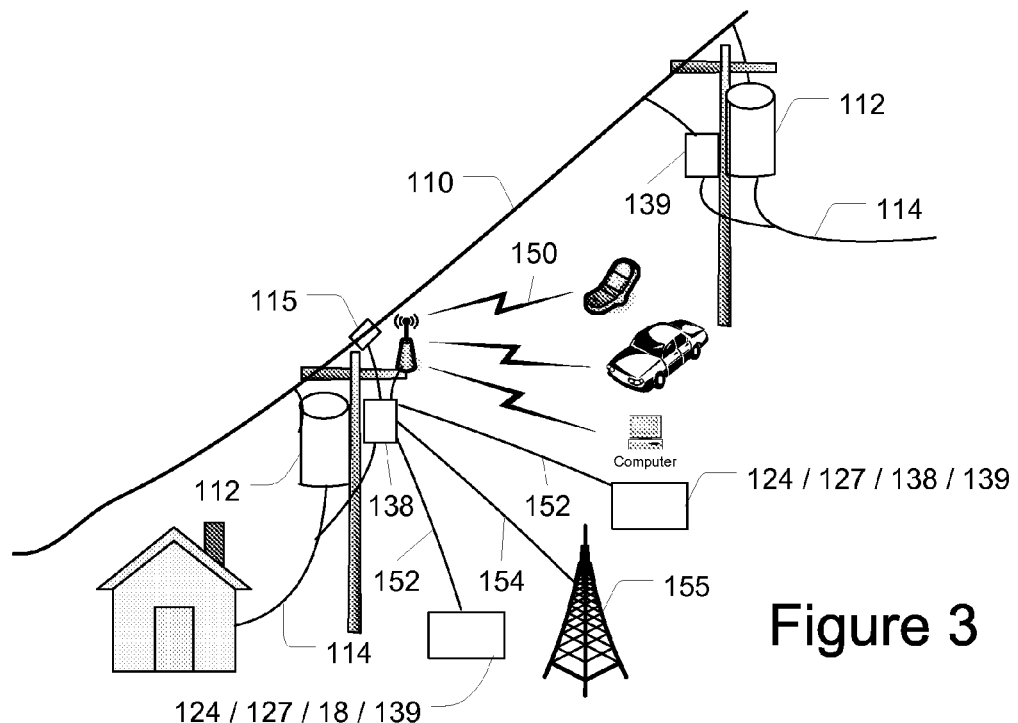
FIG. 3 illustrates an example implementation of an example embodiment of a backhaul node according to the present invention.

FIGS. 2 and 3 show an example embodiment of a backhaul device 138 which may form all or part of a backhaul node 132. The backhaul device 138 may include a medium voltage power line interface (MV Interface) 140, a controller 142, an expansion port 146, and a gigabit Ethernet (gig-E) switch 148. In some embodiments the backhaul device 138 also may include a low voltage power line interface (LV interface) 144. The MV interface 140 is used to communicate over the MV power lines and may include an MV power line coupler (not shown) coupled to an MV signal conditioner, which may be coupled to an MV modem 141. The MV power line coupler prevents the medium voltage power from passing from the MV power line 110 to the rest of the device's circuitry, while allowing the communications signal to pass between the backhaul device 138 and the MV power line 110. The MV signal conditioner may provide amplification, filtering, frequency translation, and transient voltage protection of data signals communicated over the MV power lines 110. Thus, the MV signal conditioner may be formed by a filter, amplifier, a mixer and local oscillator, and other circuits which provide transient voltage protection. The MV modem 141 may demodulate, decrypt, and decode data signals received from the MV signal conditioner and may encode, encrypt, and modulate data signals to be provided to the MV signal conditioner.

The backhaul device 138 also may include a low voltage power line interface (LV Interface) 144 for receiving and transmitting data over an LV power line 114. The LV interface 144 may include an LV power line coupler (not shown) coupled to an LV signal conditioner, which may be coupled to an LV modem 143. In one embodiment the LV power line coupler may be an inductive coupler. In another embodiment the LV power line coupler may be a conductive coupler. The LV signal conditioner may provide amplification, filtering, frequency translation, and transient voltage protection of data signals communicated over the LV power lines 114. Data signals received by the LV signal conditioner may be provided to the LV modem 143. Thus, data signals from the LV modem 143 are transmitted over the LV power lines 110 through the signal conditioner and coupler. The LV signal conditioner may be formed by a filter, amplifier, a mixer and local oscillator, and other circuits which provide transient voltage protection. The LV modem 143 may demodulate, decrypt, and decode data signals received from the LV signal conditioner and may encode, encrypt, and modulate data signals to be provided to the LV signal conditioner.

The backhaul device 138 also may include an expansion port 146, which may be used to connect to a variety of devices. For example a wireless access point, which may include a wireless transceiver or modem 147, may be integral to or coupled to the backhaul device 138 via the expansion port 146. The wireless modem 147 may establish and maintain a communication link 150. In other embodiments a communication link is established and maintained over an alternative communications medium (e.g., fiber optic, cable, twisted pair) using an alternative transceiver device. In such other embodiments the expansion port 146 may provide an Ethernet connection allowing communications with various devices over optical fiber, coaxial cable or other wired medium. In such embodiment the modem 147 may be an Ethernet transceiver (fiber or copper) or other suitable modem may be employed (e.g., cable modem, DSL modem). In other embodiments, the expansion port may be coupled to a Wifi access point (IEEE 802.11 transceiver), WiMAX (IEEE 802.16), or mobile telephone cell site. The expansion port may be employed to establish a communication link 150 between the backhaul device 138 and devices at a residence, building, other structure, another fixed location, or between the backhaul device 138 and a mobile device.

Various sensor devices 115 also may be connected to the backhaul device 138 through the expansion port 146 or via other means (e.g., a dedicated sensor device interface not shown). Exemplary sensors that may form part of a power distribution parameter sensor device 116 and be coupled to the backhaul device 138 may include, a current sensor, voltage sensor, a level sensor (to determine pole tilt), a camera (e.g., for monitoring security, detecting motion, monitoring children's areas, monitoring a pet area), an audio input device (e.g., microphone for monitoring children, detecting noises), a vibration sensor, a motion sensor (e.g., an infrared motion sensor for security), a home security system, a smoke detector, a heat detector, a carbon monoxide detector, a natural gas detector, a thermometer, a barometer, a biohazard detector, a water or moisture sensor, a temperature sensor, a power factor sensor, and a light sensor. The expansion port may provide direct access to the core processor (which may form part of the controller 142) through a MII (Media Independent Interface), parallel, serial, or other connection. This direct processor interface may then be used to provide processing services and control to devices connected via the expansion port thereby allowing for a more less expensive device (e.g., sensor). The power parameter sensor device 115 may measure and/or detect one or more parameters, which, for example, may include power usage data, power line voltage data, power line current data, detection of a power outage, detection of a street light failure, power delivered to a transformer data, power factor data (e.g., the phase angle between the voltage and current of a power line), power delivered to a downstream branch data, data of the harmonic components of a power signal, load transients data, and/or load distribution data. In addition, the backhaul device 138 may include multiple sensor devices 115 so that parameters of multiple power lines may be measured such as a separate parameter sensor device 116 on each of three MV power line conductors and a separate parameter sensor device on each of two energized LV power line conductors and one on each neutral conductor. One skilled in the art will appreciate that other types of utility data also may be gathered. As will be evident to those skilled in the art, the expansion port may be coupled to an interface for communicating with the interface 206 of the sensor device 116 via a non-conductive communication link.

The backhaul device 138 also may include a gigabit Ethernet (Gig-E) switch 148. Gigabit Ethernet is a term describing various technologies for implementing Ethernet networking at a nominal speed of one gigabit per second, as defined by the IEEE 802.3z and 802.3ab standards. There are a number of different physical layer standards for implementing gigabit Ethernet using optical fiber, twisted pair cable, or balanced copper cable. In 2002, the IEEE ratified a 10 Gigabit Ethernet standard which provides data rates at 10 gigabits per second. The 10 gigabit Ethernet standard encompasses seven different media types for LAN, MAN and WAN. Accordingly the gig-E switch may be rated at 1 gigabit per second (or greater as for a 10 gigabit Ethernet switch).

The switch 148 may be included in the same housing or co-located with the other components of the node (e.g., mounted at or near the same utility pole or transformer). The gig-E switch 148 maintains a table of which communication devices are connected to which switch 148 port (e.g., based on MAC address). When a communication device transmits a data packet, the switch receiving the packet determines the data packet's destination address and forwards the packet towards the destination device rather than to every device in a given network. This greatly increases the potential speed of the network because collisions are substantially reduced or eliminated, and multiple communications may occur simultaneously.

The gig-E switch 148 may include an upstream port for maintaining a communication link 152 with an upstream device (e.g., a backhaul node 132, an aggregation point 124, a distribution point 127), a downstream port for maintaining a communication link 152 with a downstream device (e.g., another backhaul node 134; an access node 134), and a local port for maintaining a communication link 154 to a Gig-E compatible device such as a mobile telephone cell cite 155 (i.e., base station), a wireless device (e.g., WiMAX (IEEE 802.16) transceiver), an access node 134, another backhaul node 132, or another device. In some embodiments the gig-E switch 148 may include additional ports.

In one embodiment, the link 154 may be connected to mobile telephone cell site configured to provide mobile telephone communications (digital or analog) and use the signal set and frequency bands suitable to communicate with mobile phones, PDAs, and other devices configured to communicate over a mobile telephone network. Mobile telephone cell sites, networks and mobile telephone communications of such mobile telephone cell sites, as used herein, are meant to include analog and digital cellular telephone cell sites, networks and communications, respectively, including, but not limited to AMPS, 1G, 2G, 3G, GSM (Global System for Mobile communications), PCS (Personal Communication Services) (sometimes referred to as digital cellular networks), 1x Evolution-Data Optimized (EVDO), and other cellular telephone cell sites and networks. One or more of these networks and cell sites may use various access technologies such as frequency division multiple access (FDMA), time division multiple access (TDMA), or code division multiple access (CDMA) (e.g., some of which may be used by 2G devices) and others may use CDMA2000 (based on 2G Code Division Multiple Access), WCDMA (UMTS)—Wideband Code Division Multiple Access, or TD-SCDMA (e.g., some of which may be used by 3G devices).

The gig-E switch 148 adds significant versatility to the backhaul device 138. For example, several backhaul devices may be coupled in a daisy chain topology (see FIG. 10), rather than by running a different fiber optic conductor to each backhaul node 134. Additionally, the local gig-E port allows a communication link 154 for connecting to high bandwidth devices (e.g., WiMAX (IEEE 802.16) or other wireless devices). The local gig-E port may maintain an Ethernet connection for communicating with various devices over optical fiber, coaxial cable or other wired medium. Exemplary devices may include user devices 130, a mobile telephone cell cite 155, and sensor devices (as described above with regard to the expansion port 146.

Communications may be input to the gig-E switch 148 from the MV interface 140, LV interface 144 or expansion port 146 through the controller 142. Communications also may be input from each of the upstream port, local port and downstream port. The gig-E switch 148 may be configured (by the controller 142 dynamically) to direct the input data from a given input port through the switch 148 to the upstream port, local port, or downstream port. An advantage of the gig-E switch 148 is that communications received at the upstream port or downstream port need not be provided (if so desired) to the controller 142. Specifically, communications received at the upstream port or downstream port may not be buffered or otherwise stored in the controller memory or processed by the controller. (Note, however, that communications received at the local port may be directed to the controller 142 for processing or for output over the MV interface 140, LV interface 144 or expansion port 146). The controller 142 controls the gig-E switch 148, allowing the switch 148 to pass data upstream and downstream (e.g. according to parameters (e.g., prioritization, rate limiting, etc.) provided by the controller). In particular, data may pass directly from the upstream port to the downstream port without the controller 142 receiving the data. Likewise, data may pass directly from the downstream port to the upstream port without the controller 142 receiving the data. Also, data may pass directly from the upstream port to the local port in a similar manner; or from the downstream port to the local port; or from the local port to the upstream port or downstream port. Moving such data through the controller 142 would significantly slow communications or require an ultra fast processor in the controller 142. Data from the controller 142 (originating from the controller 142 or received via the MV interface 140, the LV interface 144, or expansion port 146) may be supplied to the Gig-E switch 148 for communication upstream (or downstream) via the upstream port (or downstream port) according to the address of the data packet. Thus, data from the controller 142 may be multiplexed in (and routed/switched) along with other data communicated by the switch 148. As used herein, to route and routing is meant to include the functions performed by of any a router, switch, and bridge.

The backhaul device 138 also may include a controller 142 which controls the operation of the device 138 by executing program codes stored in memory. In addition, the program code may be executable to process the measured parameter data to, for example, convert the measured data to current, voltage, or power factor data. The backhaul 138 may also include a router, which routes data along an appropriate path. In this example embodiment, the controller 142 includes program code for performing routing (hereinafter to include switching and/or bridging). Thus, the controller 142 may maintain a table of which communication devices are connected to port in memory. The controller 142, of this embodiment, matches data packets with specific messages (e.g., control messages) and destinations, performs traffic control functions, performs usage tracking functions, authorizing functions, throughput control functions and similar related services. Communications entering the backhaul device 138 from the MV power lines 110 at the MV interface 140 are received, and then may be routed to the LV interface 144, expansion port 146 or gig-E switch 148. Communications entering the backhaul device 138 from the LV power lines 114 at the LV interface 144 are received, and may then be routed to the MV interface 140, the expansion port 146, or the gig-E switch 148. Communications entering the backhaul device 138 from the expansion port 146 are received, and may then be routed to the MV interface 140, the LV interface 144, or the gig-E switch 148. Accordingly, the controller 142 may receive data from the MV interface 140, LV interface 144 or the expansion port 146, and may route the received data to the MV interface 140, LV interface 144, the expansion port 146, or gig-E switch 148. In this example embodiment, user data may be routed based on the destination address of the packet (e.g., the IP destination address). Not all data packets, of course, are routed. Some packets received may not have a destination address for which the particular backhaul device 138 routes data packets. Additionally, some data packets may be addressed to the backhaul device 138. In such case the backhaul device may process the data as a control message.

Figure 4:
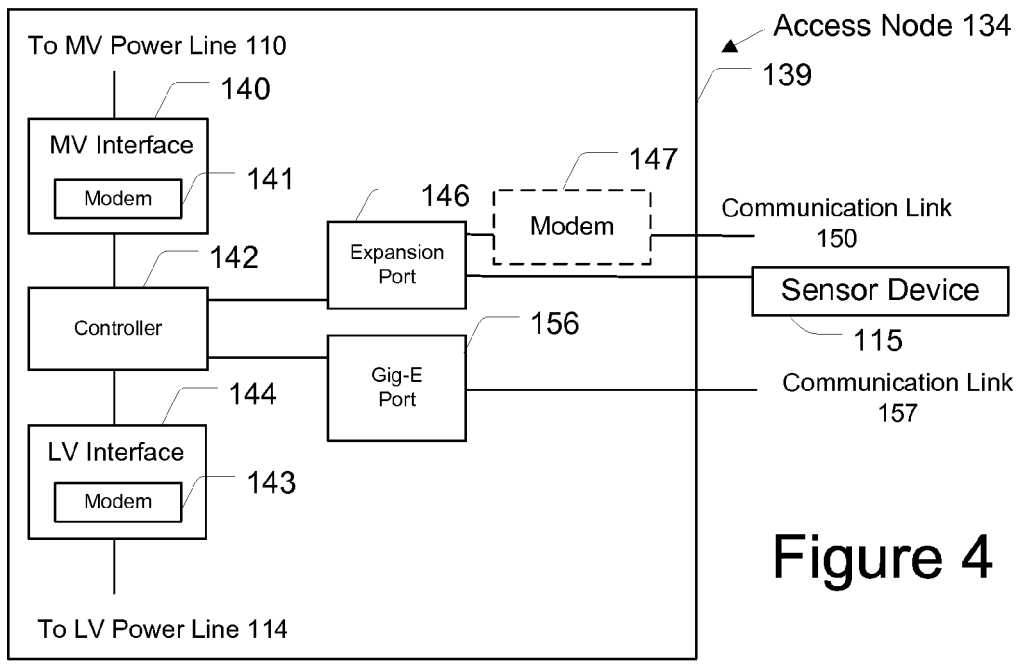
FIG. 4 is a block diagram of an example embodiment of an access node and sensor device according to the present invention.
Figure 5:
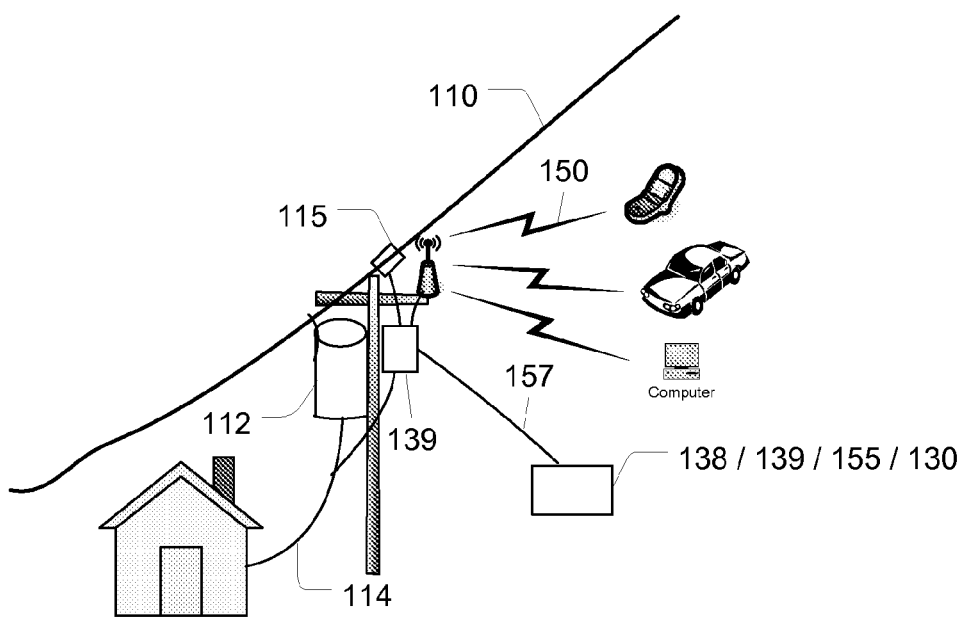
FIG. 5 illustrates an example implementation of an example embodiment of an access node according to the present invention.

Access Device 139:

The backhaul nodes 132 may communicate with user devices directly or via one or more access nodes 134, which may include an access device 139. FIGS. 4 and 5 show an example embodiment of such an access device 139 for providing communication services to mobile devices and to user devices at a residence, building, and other locations. Although FIG. 5 shows the access node 134 coupled to an overhead power line, in other embodiments an access node 134 (and its associated sensor devices 115) may be coupled to an underground power line.

In one example embodiment, access nodes 124 provide communication services for user devices 130 such as security management; IP network protocol (IP) packet routing; data filtering; access control; service level monitoring; service level management; signal processing; and modulation/demodulation of signals transmitted over the communication medium.

The access device 139 of this example node 134 may comprise a bypass device that moves data between an MV power line 110 and an LV power line 114. The access device 139 may include a medium voltage power line interface (MV Interface) 140 having a MV modem 141, a controller 142, a low voltage power line interface (LV interface) 144 having a LV modem 143, and an expansion port 146, which may have the functionality, functional components (and for connecting to devices, such as power line parameter sensor device 115) as previously described above with regard of the backhaul device 138. The access device 139 also may include a gigabit Ethernet (gig-E) port 156. The gig-E port 156 maintains a connection using a gigabit Ethernet protocol as described above for the gig-E switch 146 of FIG. 6. The power parameter sensor device 116 may be connected to the access device 139 to measure and/or detect one or more parameters of the MV power and/or the LV power line, which, for example, may include power usage data, power line voltage data, power line current data, detection of a power outage, detection of a street light failure, power delivered to a transformer data, power factor data (e.g., the phase angle between the voltage and current of a power line), power delivered to a downstream branch data, data of the harmonic components of a power signal, load transients data, and/or load distribution data. In addition, the access device 134 may include multiple sensor devices 116 so that parameters of multiple power lines may be measured such as a separate parameter sensor device 116 on each of three MV power line conductors and a separate parameter sensor device on each of two energized LV power line conductors and one on each neutral conductor. One skilled in the art will appreciate that other types of utility data also may be gathered. The sensor devices 115 described herein may be co-located with the power line communication device with which the sensor device 115 communicates or may be displaced from such device (e.g., at the next utility pole or transformer).

The Gig-E port 156 may maintain an Ethernet connection for communicating with various devices over optical fiber, coaxial cable or other wired medium. For example, a communication link 157 may be maintained between the access device 139 and another device through the gig-E port 156. For example, the gig-E port 156 may provide a connection to user devices 130, sensor devices (as described above with regard to the expansion port 146, such as to power line parameter sensor device 115), or a cell station 155.

Communications may be received at the access device 139 through the MV interface 140, LV interface 144, expansion port 146 or gig-E port 156. Communications may enter the access device 139 from the MV power lines 110 through the MV interface 140, and then may be routed to the LV interface 142, expansion port 146 or gig-E port 156. Communications may enter the access device 139 from the LV power lines 114 through the LV interface 144, and then may be routed to the MV interface 140, the expansion port 146, or the gig-E port 156. Communications may enter the access device 139 from the expansion port 146, and then may routed to the MV interface 140, the LV interface 144, or the gig-E port 156. Communications may enter the access device 139 via the gig-E port 156, and then may be routed to the MV interface 140, the LV interface 144, or the expansion port 146. The controller 142 controls communications through the access device 139. Accordingly, the access device 139 receives data from the MV interface 140, LV interface 144, the expansion port 146, or the gig-E port 156 and may route the data to the MV interface 140, LV interface 144, expansion port 146, or gig-E port 156 under the direction of the controller 142. In one example embodiment, the access node 134 may be coupled to a backhaul node 132 via a wired medium coupled to Gig-E port 156 while in another embodiment, the access node is coupled to the backhaul node 132 via an MV power line (via MV interface 140). In yet another embodiment, the access node 134 may be coupled to a backhaul node 132 via a wireless link (via expansion port 146 or Gig-E port 156). In addition, the controller may include program code that is executable to control the operation of the device 139 and to process the measured parameter data to, for example, convert the measured data to current, voltage, or power factor data.

Other Devices:

Another communication device is a repeater (e.g., indoor, outdoor, low voltage (LVR) and/or medium voltage) which may form part of a repeater node 135 (see FIG. 1). A repeater serves to extend the communication range of other communication elements (e.g., access devices, backhaul devices, and other nodes). The repeater may be coupled to power lines (e.g., MV power line; LV power line) and other communication media (e.g., fiber optical cable, coaxial cable, T-1 line or wireless medium). Note that in some embodiments, a repeater node 135 may also include a device for providing communications to a user device 130 (and thus also serve as an access node 134).

In various embodiments a user device 130 is coupled to an access node 134 using a modem. For a power line medium, a power line modem 136 is used. For a wireless medium, a wireless modem is used. For a coaxial cable, a cable modem is may be used. For a twisted pair, a DSL modem may be used. The specific type of modem depends on the type of medium linking the access node 134 and user device 130.

In addition, the PLCS may include intelligent power meters, which, in addition to measuring power usage, may include a parameter sensor device 115 and also have communication capabilities (a controller coupled to a modem coupled to the LV power line) for communicating the measured parameter data to the access node 134. Detailed descriptions of some examples of such power meter modules are provided in U.S. patent application Ser. No. 11/341,646, filed on Jan. 30, 2006 entitled, "Power Line Communications Module and Method," which is hereby incorporated herein by reference in it entirety.

A power line modem 136 couples a communication onto or off of an LV power line 114. A power line modem 136 is coupled on one side to the LV power line. On the other side, the power line modem 136 includes a connector to connect to a wired or wireless medium leading to the user device 130. One protocol for communicating with access nodes 132 over an LV power line is the HomePlug 1.0 standard of the HomePlug® Alliance for routing communications over low voltage power lines. In this manner, a customer can connect a variety of user devices 130 to the communication network 104.

Power Distribution Parameter Sensor Device:

In an example embodiment, the sensor device may comprise a power line current sensor that is formed of a Rogowski coil and such sensor device may be installed throughout a network (on both MV and LV power lines). The Rogowski coil is an electrical device for measuring alternating current (AC) or high speed current pulses. An exemplary embodiment includes a first and second helical coils of wire (loops) electrically connected in series with each other. The first loop is wound with a substantially constant winding density in a first direction around a core that has a substantially constant cross section. The second loop is wound with a substantially constant winding density in a second direction around a core that has a substantially constant cross section. A conductor (e.g., a power line) whose current is to be measured traverses through the loops. A voltage may be induced in the coil based on the rate of change of the current running through the power line. Rogowski coils may have other configurations as well.

One advantage of a Rogowski coil is that it may be open-ended and flexible, allowing it to be wrapped around an energized conductor. Also, a Rogowski coil may include an air core (or other dielectric core) rather than an iron core, which gives the coil a low inductance and an ability to respond to fast-changing currents. Further, the Rogowski coil typically is highly linear, even when subjected to large currents, such as those of low voltage and medium voltage power lines. By forming the Rogowski coil with equally spaced windings, effects of electromagnetic interference may be substantially avoided and therefore the output of the Rogowski coil is proportional only to the current in the threading conductor. On method of providing equal spaced windings is to use printed circuit boards to manufacture the coil. In one embodiment, a Rogowski coil that does not include reverse direction interleaved windings may be used (and that is not formed of a printed circuit board). Other types of current sensors also may be used as well.

A power line parameter sensor device 115 may be located in the vicinity of, and communicatively coupled to, a power line communication device 134, 135, 132 (referred to herein as a power line communication device 137, which is meant to refer any of such devices 134, 135, 132). The power line parameter sensor device 115 measures (which may include simply detecting the presence of (or absence of) a parameter in some instances) a power distribution parameter, such as current, voltage, power usage data, detection of a power outage, power delivered to a transformer data (i.e., wherein the sensor device is coupled the conductor that connects the distribution transformer to the MV power line), power factor (e.g., derived from (the cosine of) the angle between the voltage and current of a power line), power delivered to a downstream branch, harmonic components of a power signal, load transients, and/or load distribution. One skilled in the art will appreciate that other types of utility parameters also may be measured. The measured parameter may be sampled by the sensor device (or power line communication device 137) and communicated to a power line server 118 (or power line communication device 137), or other power line distribution management system and/or power line communication management system, which may process the data to determine whether the characteristics of the parameter match those of a triggering event (discussed below).

In various embodiments, the power line distribution parameter sensor device 115 may measure or detect a parameter of a power line 110, 114, such as current, voltage, power usage data, detection of a power outage, detection of a street light failure, power delivered to a transformer data (e.g., the sensor device may be coupled to (or on the side(s)) of the tap conductor 165 that connects the distribution transformer to the MV power line), power factor (e.g., the phase angle between the voltage and current of a power line, which may be determined by processing data from multiple sensors (i.e., current and voltage)), power delivered to a downstream branch data, data of the harmonic components of a power signal, load transients data, load distribution data, and/or other characteristics. One skilled in the art will appreciate that other types of parameter data also may be gathered. In addition, one sensor device 115 may be configured to provide data of more than one parameter. For example, a sensor device 115 may be configured to provide data of the voltage and current carried by the power line (and therefore have multiple sensors). One or more sensor devices 115 may be installed at a given power line 110 and/or 114 and be coupled to a corresponding power line communication device 137. For example, a power line current sensor device may be installed at power lines 110 and 114 alone or with another power line parameter sensor device (e.g., a power line voltage sensor device). Such a configuration may be used to determine the current and power into and out of a transformer. In addition, the data provided by the sensor device 115 may be used to determine additional parameters (either by the sensor device, the power line communication device, or a remote computer). For example, a sensor device 115 may be configured to measure the instantaneous voltage and current (e.g., over brief time period). The measurement data may be provided to the power line communication device 137 for processing. With adequate voltage and current sampling, the device 137 may compute the power factor of the power line (through means well known in the art). Thus, other power line parameters may be measured using an appropriate sensor device coupled to a power line 110, 114 in the vicinity of a power line communication device 137 in place of, or in addition to, the power line current sensor device.

The parameter sensor devices 115 and applications for using the related data also be incorporated in power line communication systems that communicate over underground power lines. Detailed descriptions of the components, features, and power line communication devices of some example underground PLCS are provided in U.S. patent application Ser. No. 11/399,529 filed on Apr. 7, 2006 entitled, issued as U.S. Pat. No. 7,450,000, "Power Line Communications Device and Method," which is hereby incorporated herein by reference in its entirety. The parameter sensor devices 115 described herein (or portions thereof) may be formed in or integrated with couplers for coupling communication signals to and from the power lines. For example, the Rogowski coils described above may be attached to the transformer side of the coupler (or integrated into the coupler) that couples to the underground (or overhead) MV power lines to allow installation of the coupler to also accomplish installation of the sensor device 115. Detailed descriptions of the components, features, and implementations of some example sensor devices are provided in U.S. patent application Ser. No. 11/555,740 filed on Nov. 2, 2006 entitled, issued as U.S. Pat. No. 7,795,877, "Power Line Communication and Power Distribution Parameter Measurement System and Method," which is hereby incorporated herein by reference in its entirety.

Network Communication Protocols:

The communication network 104 may provide high speed internet access and other high data-rate data services to user devices, homes, buildings and other structure, and to each room, office, apartment, or other unit or sub-unit of multi-unit structure. In doing so, a communication link is formed between two communication nodes 128 over a communication medium. Some links are formed by using a portion 101 of the power system infrastructure. Specifically, some links are formed over MV power lines 110, and other links are formed over LV power lines 114. Still other links may be formed over another communication media, (e.g., a coaxial cable, a T-1 line, a fiber optic cable, wirelessly (e.g., IEEE 802.11 a/b/g, 802.16, 1G, 2G, 3G, or satellite such as WildBlue®)). Some links may comprise wired Ethernet, multipoint microwave distribution system (MMDS) standards, DOCSIS (Data Over Cable System Interface Specification) signal standards or another suitable communication method. The wireless links may also use any suitable frequency band. In one example, frequency bands are used that are selected from among ranges of licensed frequency bands (e.g., 6 GHz, 11 GHz, 18 GHz, 23 GHz, 24 GHz, 28 GHz, or 38 GHz band) and unlicensed frequency bands (e.g., 900 MHz, 2.4 GHz, 5.8 GHz, 24 GHz, 38 GHz, or 60 GHz (i.e., 57-64 GHz)).

Accordingly, the communication network 104 includes links that may be formed by power lines, non-power line wired media, and wireless media. The links may occur at any point along a communication path between a backhaul node 132 and a user device 130, or between a backhaul node 132 and a distribution point 127 or aggregation point 124.

Communication among nodes 128 may occur using a variety of protocols and media. In one example, the nodes 128 may use time division multiplexing and implement one or more layers of the 7 layer open systems interconnection (OSI) model. For example, at the layer 3 'network' level, the devices and software may implement switching and routing technologies, and create logical paths, known as virtual circuits, for transmitting data from node to node. Similarly, error handling, congestion control and packet sequencing can be performed at Layer 3. In one example embodiment, Layer 2 'data link' activities include encoding and decoding data packets and handling errors of the 'physical' layer 1, along with flow control and frame synchronization. The configuration of the various communication nodes may vary. For example, the nodes coupled to power lines may include a modem that is substantially compatible with the HomePlug 1.0 or A/V standard. In various embodiments, the communications among nodes may be time division multiple access or frequency division multiple access.

Software:

The communication network 104 may be monitored and controlled via a power line server that may be remote from the structure and physical location of the network elements. The controller of the nodes 128 describe herein may include executable program code for controlling the operation of the nodes and responding to commands. The PLS may transmit any number of commands to a backhaul nodes 132 and access nodes 134 to manage the system. As will be evident to those skilled in the art, most of these commands are equally applicable for backhaul nodes 132 and access nodes 134. For ease of discussion, the description of the commands will be in the context of a node 128 (meant to include both). These commands may include altering configuration information, synchronizing the time of the node 128 with that of the PLS, controlling measurement intervals (e.g., voltage measurements), requesting measurement or data statistics, requesting the status of user device activations, rate shaping, and requesting reset or other system-level commands. Any or all of these commands may require a unique response from the node 128, which may be transmitted by the node 128 and received and stored by the PLS. The PLS may include software to transmit a command to any or all of the nodes (134 and 132) to schedule a voltage and/or current measurement at any particular time so that all of the network elements of the PLCS take the measurement(s) at the same time.

Alerts

In addition to commands and responses, the node 128 has the ability to send Alerts and Alarms to the PLS. Alerts typically are either warnings or informational messages transmitted to the PLS in light of events detected or measured by the node 128. Alarms typically are error conditions detected.

One example of an Alarm is an Out-of-Limit Alarm that indicates that an out-of-limit condition has been detected at the node 128, which may indicate a power outage on the LV power line, an MV or LV voltage too high, an MV or LV voltage too low, a temperature measurement inside the node 128 is too high, and/or other out-of-limit conditions. Information of the Out-of-Limit condition, such as the type of condition (e.g., a LV voltage measurement, a node 128 temperature), the Out-of-Limit threshold exceeded, the time of detection, the amount (e.g., over, under, etc.) the out of limit threshold has been exceeded, is stored in the memory of the node 128 and transmitted with the alert or transmitted in response to a request from the PLS.

Software Upgrade Handler

The Software Upgrade Handler software may be started by the node 128 Command Processing software in response to a PLS command. Information needed to download the upgrade file, including for example the remote file name and PLS IP address, may be included in the parameters passed to the Software Command Handler within the PLS command.

Upon startup, the Software Command Handler task may open a file transfer program such as Trivial File Transfer Protocol (TFTP) to provide a connection to the PLS and request the file. The requested file may then be downloaded to the node 128. For example, the PLS may transmit the upgrade through the Internet to the node 128 (and perhaps through the backhaul node, and over the MV power line) where the upgrade may be stored in a local RAM buffer and validated (e.g., error checked) while the node 128 continues to operate (i.e., continues to communicate packets). Finally, the task copies the downloaded software into a backup boot page in non-volatile memory, and transmits an Alert indicating successful installation to the PLS. The node 128 then makes the downloaded software the primary boot page and reboots. When the device restarts the downloaded software will be copied to RAM and executed. The device will then notify the PLS that it has rebooted via an alert indicating such. In addition, and through substantially the same procedure, new software code may be received by the controller for storage in (e.g., to replace existing code) and execution at the media access control (MAC) layer of the LV modem and/or the MV modem of the access device or the backhaul device.

ADC Scheduler

Any of the nodes described herein may include an analog to digital converter (ADC) for measuring the voltage, current, and/or other parameters of any power line 110, 114. The ADC may be located within the power line parameter sensor device 115 or within the power line communication device 137. The ADC Scheduler software, in conjunction with the real-time operating system, creates ADC scheduler tasks to perform ADC sampling according to configurable periods for each sample type. Each sample type corresponds with an ADC channel. The ADC Scheduler software creates a scheduling table in memory with entries for each sampling channel according to default configurations or commands received from the PLS. The table contains timer intervals for the next sample for each ADC channel, which are monitored by the ADC scheduler.

ADC Measurement Software

The ADC Measurement Software, in conjunction with the real-time operating system, creates ADC measurement tasks that are responsible for monitoring and measuring data accessible through the ADC 330 such as the power distribution parameter sensor devices 115 (including the current sensor devices 115 and voltage sensor devices) described herein. Each separate measurable parameter may have an ADC measurement task. Each ADC measurement task may have configurable rates for processing, recording, and reporting for example.

An ADC measurement task may wait on a timer (set by the ADC scheduler). When the timer expires the task may retrieve all new ADC samples for that measurement type from the sample buffer, which may be one or more samples. The raw samples are converted into a measurement value. The measurement is given the timestamp of the last ADC sample used to make the measurement. The measurement may require further processing. If the measurement (or processed measurement) exceeds limit values, an alert condition may be generated. Out of limit Alerts may be transmitted to the PLS and repeated at the report rate until the measurement is back within limits. An out of limit recovery Alert may be generated (and transmitted to the PLS) when the out of limit condition is cleared (i.e., the measured value falls back within limit conditions).

The measurements performed by the ADC, each of which has a corresponding ADC measurement task, may include node 128 inside temperature, LV power line voltage, LV power line temperature, MV power line temperature, LV power line current, MV power line voltage, transformer temperature, and/or MV power line current for example. MV and LV power line measurements may be accomplished via the power line parameter sensor devices 115.

As discussed, the nodes may include value limits for most of these measurements stored in memory with which the measured value may be compared. If a measurement is below a lower limit, or above an upper limit (or otherwise out of an acceptable range), the node 128 may transmit an Out-of-Limit Alert. Such alert may be received and stored by the PLS. In some instances, one or more measured values are processed to convert the measured value(s) to a standard or more conventional data value.

The LV power line voltage measurement may be used to provide various information. For example, the measurement may be used to determine a power outage (and subsequently a restoration), or measure the power used by a consumer (when current data is also available) or by all of the consumers connected to that distribution transformer. In addition, it may be used to determine the power quality of the LV power line by measuring and processing the measured values over time to provide frequency, harmonic content, and other power line quality characteristics.

Notification Communications

As discussed, it is desirable to identify and locate power distribution events that may adversely affect power delivery. Examples of power distribution events that may have adverse effects include potential and existing power faults and power outages. A fault is an abnormal situation in which power flows through (or to) an unintended location, such to ground, or to another electrical wire (e.g., another MV phase conductor, or a neutral). A transient fault is a fault that is no longer present if power is disconnected for a short time. Faults in overhead power lines are often transient. For example, a tree momentarily contacting a power line may cause a transient fault. Similarly, if a voltage arc is created from a power line due to lightning, the arc may be fed by distribution system power causing disruption to components of the power distribution system. If the power is disconnected for a short time, the voltage arc may disappear and after power is re-established, the power line may operate normally. A persistent fault is a fault that does not disappear when power is disconnected. Faults in underground power lines—such as a break in a underground power cable—are often persistent and (if power were maintained) allow current to flow to ground. High impedance faults are more common on overhead power lines when the power line breaks, in which case there is not an increase in current (e.g., the broken power "dances" on the pavement). It is desirable to isolate a power fault while permitting continued operation of as much of the power distribution system as possible.

A power outage is a loss of power which may be measured as approximately a zero current flow along a power line or zero voltage on a power line. A power outage may result from equipment failure in a power station, a substation, a transformer, or an overload to the MV power lines (causing a fuse to blow, a switch to open, a recloser to open, etc.). A power outage may also be caused by damage to a power line (e.g., a break) as discussed above. A "brownout" is a term used to refer to a condition in which the voltage of a power line (e.g., a low voltage power line) is below a normal minimum level, as specified for the given distribution system, but greater than zero. Some brownouts, also referred to as voltage reductions, are made intentionally to prevent a power outage. For example, power distribution capacity may be rotated among various districts to avoid total area or regional blackouts when the power draw exceeds or approaches generation capacity.

Specific power line distribution parameters have been found to be reliable indicators for detecting and/or predicting faults and outages. One such parameter is power line voltage. Specifically, a voltage drop on both of the energized conductors of an LV power line 114 below a threshold voltage for a predetermined duration often precedes a power fault and power outage. Detection of such a voltage drop (or other power distribution parameter event) is referred to herein as a trigger event. Another trigger event may include detection of a load imbalance above a predetermined amount (e.g., a percentage) on the energized conductors of the LV power line 114 for a predetermined duration. Still another trigger event may comprise detection of a voltage drop on an MV power line 110 below a threshold voltage for a predetermined duration. Yet another trigger event may comprise detection of a current increase on a MV power line 110 above a threshold current for a predetermined duration. Another trigger event may include detection of a current decrease on an MV power line 110 below a threshold level for a predetermined duration. In addition, some of these trigger events (or others), when detected in combination, may comprise additional trigger events that may be representative (or a prediction) of a different power distribution event or the same power distribution event and may be a more reliable indicator of a future power distribution event. Accordingly, it may be desirable to obtain power line voltage and/or power line current data to monitor the power distribution system to thereby identify one or more trigger events.

Figure 6:
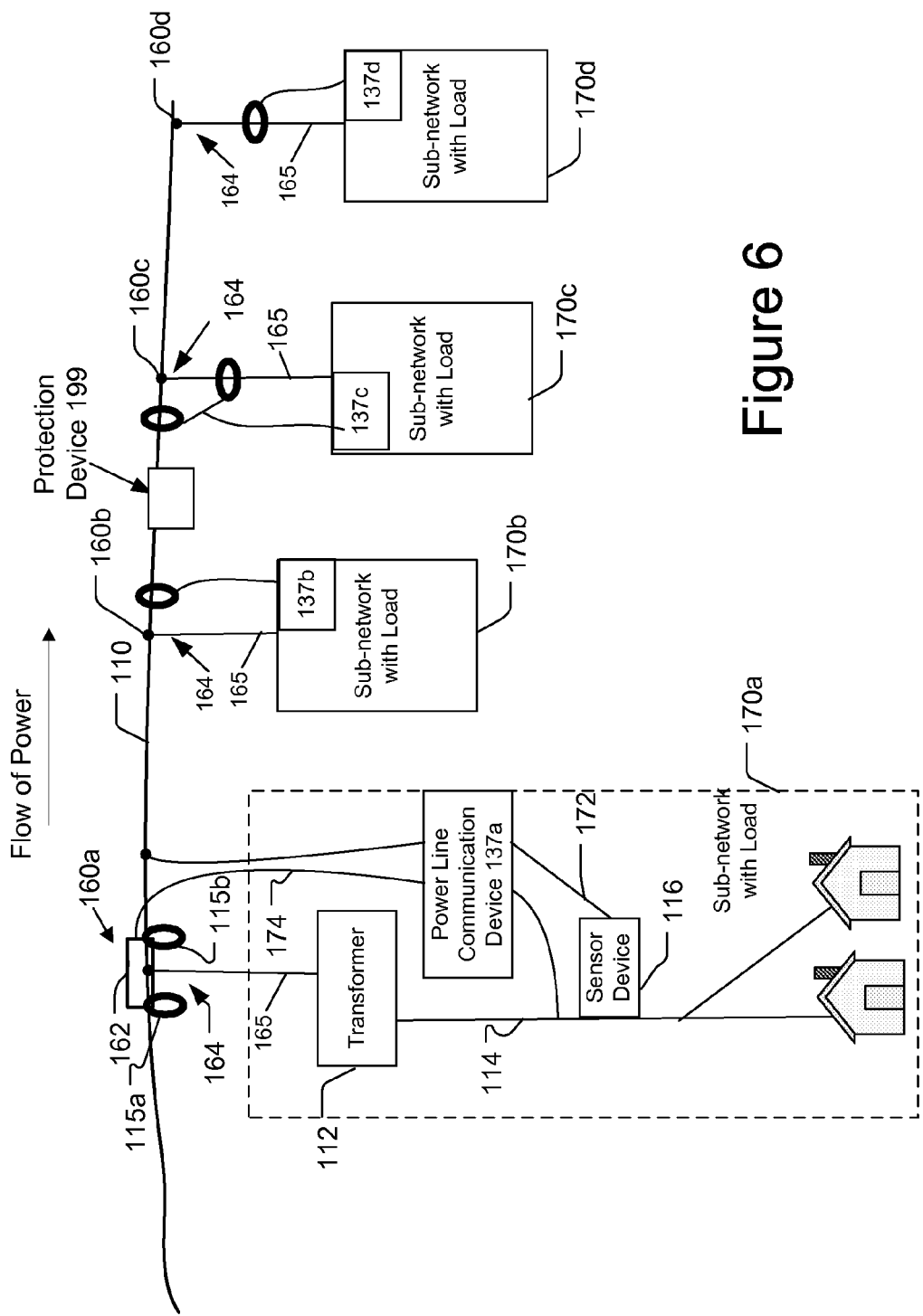
FIG. 6 illustrates a plurality of sensor devices located at various positions for collecting power line distribution parameter data according to an example embodiment of the present invention.

In many instances, a power fault occurs wherein the current exceeds that permitted by a protection device that may be a current limiting device such as a fuse, circuit breaker, etc. The excessive current draw may also reduce the voltage for a short time until the protection device "trips." When the current on the MV power line exceeds the current threshold, the current limiting device trips thereby stopping the flow of current to the power distribution system on the downstream side of the current limiting device, but does not affect the power distribution system on the upstream side of the device. Referring to FIG. 6, a MV power line 110 with multiple transformers 112 connected thereto and a power line communication device 137 is installed at each transformer 112 forming part of each subnet 170. In this example, a protection device 199 (e.g., fuse, recloser, circuit breaker, etc.) is installed between transformers 112 connected to taps 160b and 160c. If an MV power line fault occurs downstream from the illustrated transformers 112 (i.e., to the right of the protection device 199 in the figure), a momentary reduction in voltage will often be experienced along the MV power line 110 at each subnet 170 (and will be measured by the power line communications devices 137 at each transformer 112). After a short time period, the protection device 199 will trip (open), stopping the flow of current to transformers 112 connected to taps 160c and 160d. Thus, the PLCDs 137c and 137d connected at subnets 170c and 170d will lose power and shut down. The PLCDs 137a and 137b connected at subnets 170a and 170b will detect a voltage drop and then restoration of power to an acceptable value. The present invention uses the time delay of the tripping of the protection device 199 to store data and transmit a last gasp notification by the devices 137c and 137d at subnets 170c-d and reduces false positives (e.g., a false notification of a loss of power) by devices 137 upstream from the protection device 199 such as the devices 137a and 137b at subnets 170a-b.

In one example embodiment, the voltage of each LV energized conductor is sample at 256 microsecond intervals that constitutes an approximately 33.54 millisecond window (resulting in 131 samples), which is slightly more than two 60 Hz AC power cycles. Next, the average of the 131 sample set is computed based on the absolute measured value. Next, the average value is compared to a reference value, which in this example is 78 volts. In this embodiment, a triggering event occurs when the computed average over the time interval is less than or equal to the reference voltage. If no triggering event occurs, another set of 131 samples is taken. The reference voltage in this example will result in a triggering event if one full AC power line cycle is lost, one half of an AC power line cycle is lost, or the continuous RMS AC voltage drops below 86.7 volts. More specifically, using this reference voltage and time interval window, a triggering event will be caused by any of:

A. one full AC power line 60 Hz cycle is lost (voltage goes to substantially zero) when the power line voltage before the loss (the reduction below the threshold) is at a maximum specified power line voltage (120 V rms+10% or 132V rms);

B. one half of an AC power line 60 Hz cycle is lost (voltage goes to substantially zero) when the power line voltage before the loss was at a minimum specified power line voltage (120 Vrms−15% or 102V rms); or C. the RMS LV voltage dips below 86.7 volts for a predetermined protracted time period (e.g., one, two, three or four cycles).

Figure 8:
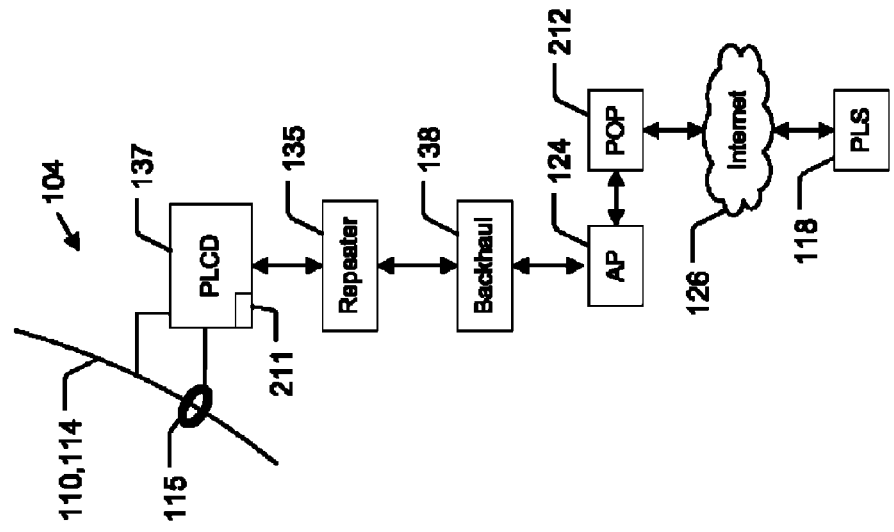
FIG. 8 is a block diagram portions of a power line communication and power parameter measurement system for implementing an example embodiment of the present invention.
Figure 7:
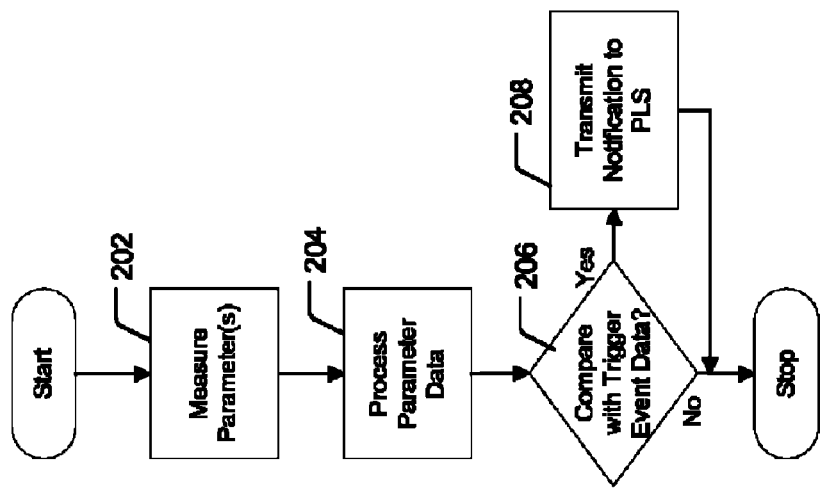
FIG. 7 is a flow chart illustrating processes for implementing an example embodiment of the present invention.

FIG. 7 is a flow chart of a process for detecting a power distribution parameter trigger event. FIG. 8 shows a portion of the power line communication and power distribution parameter measurement system 104 of FIG. 1. At step 202 of FIG. 7, one or more power line parameters are measured. A power line communication device (PLCD) 137 (for example) receives the parameter data from the one or more power line parameter sensor devices 115 (such as voltage, current, power factor, or other sensor devices). In various embodiments the PLCD 137 may be an access device 139, a backhaul device 138 or repeater 135.

FIG. 8 shows an example implementation in which an access device 139 (PLCD 137) receives parameter data (which may comprise digital data or analog signals that, for example, are proportional to the measured parameter) from a power distribution sensor device 115. The access device 139 may be part of an access node that couples to a LV power line 114 and a MV power line 110 (e.g., to allow data signals to bypass a distribution transformer).

Power distribution parameter sensors 115 may be located on the LV power line 114 and/or the MV power line 110. For example, current sensors may be coupled to each of the two energized conductors of the LV power line 114 (and the neutral conductor). Multiple sensors may be communicatively coupled to a PLCD 137 wirelessly or through a wired connection. In an example embodiment, the access device 139 may obtain voltage samples every 256 microseconds from each of the two energized conductors of the LV power line 114. In various embodiments, the samples may or may not be synchronized to the 60 Hz power signal propagating along the power lines.

At step 204, the parameter data is processed by the PLCD 137. In one embodiment, the processing includes taking the average of the samples over a window of time such as taking the average of the 131 samples over the 33.54 milliseconds as described above. In another embodiment, data of a moving sequence of power distribution parameter samples may be averaged. For example, multiple samples may be gathered over a predetermined time period and averaged (referred to herein as a trailing average). In addition, the time period of the samples may move forward in time (referred to herein as a moving window) to thereby provide a moving window trailing average. Using an average measurement over the time interval, as opposed to an instantaneous measurement, may prevent some smaller transients (anomalies) from being falsely identified as a trigger event. The average value over the time period of the moving window may be compared to a threshold value such as for example 78 volts (step 206) to determine whether a reportable power distribution parameter event has occurred. With each sample, the moving window may be updated, the average recalculated, and then compared with a corresponding threshold value. As another example, the measured data may be converted to root mean square (rms) data. In yet another example, voltage and current data may be used to compute data of the power, the power factor, the real power, the reactive power. and/or another parameter.

As stated at step 206 the processed data (voltage data) may be compared with trigger data (e.g., 78 volts) associated with one or more trigger events to determine if the processed measurement data indicates any of the trigger events discussed above are present. The trigger data may be stored in the memory of the PLCD 137 and retrieved to be compared with the processed measurement data to determine whether a trigger event has occurred. The trigger data may be different for each type of trigger event. For example, in some instances the trigger data may be (1) a maximum threshold value, (2) a minimum threshold value (e.g., current, voltage, power factor, etc.), (3) a maximum threshold value (e.g., current, voltage, power factor, etc.) and a minimum duration, (4) a minimum threshold value and a minimum duration, (5) and/or other criteria. Thus, for those trigger events that include duration criteria, multiple samples may be taken (as discussed above with respect to the moving average).

When a trigger event is detected, at step 208 a notification (e.g., a communication reporting the event) may be transmitted to the power line server 118 or other remote device for processing. In addition, in this and the other embodiments, much of data processing and other processes may be performed by a remote device (such as a backhaul node, PLS or utility computer system). For example, the measurement data may be transmitted to a remote computer system that processes the data (204) and then compares the data with the trigger data (206), and then transmits the notification (208) if necessary. In addition, when a trigger event occurs, the device 137 may transmit a notification (a last gasp) and store flag data in a non-volatile memory (e.g., a flag bit) prior to shutting down (due to lack of power). The stored data is then retrieved when the device 137 powers up and informs the device 137 that it was shut down as a result of a power loss. Upon retrieval of the data from memory at power up, the device 137 then sends a "live alert" to the power line server or other remote computer indicating that its shut down was a result of a power loss and that it has re-joined the network.

In one embodiment the moving window over which the samples are averaged may have a duration of two 60 Hz cycles (i.e., 33.3 ms). In another embodiment, the moving window may have a duration of one 60 Hz cycle (16.67 ms). The specific length of the moving window may vary in different embodiments. However, when the window is too narrow (e.g., one cycle) there may be a risk of a false positive, (e.g., transient noise). When the window is too wide (e.g., four cycles), the effect of the event (e.g., the fault or outage) may prevent the PLCD 137 from reporting the event or prevent a transmitted communication from reaching an upstream destination. For example, in the presence of an imminent power outage, the access device 139 will lose power because the power lines to which the PLCD 137 is connected lose power (e.g., because the power lines may be physically cut or otherwise disrupted or a fault occurs tripping a switch). Consequently, a sample window that is too long may prevent the PLCD 137 from identifying the trigger event and transmitting the notification before the PLCD loses power.

In one embodiment, when the triggering event occurs the access device 139 may include circuitry and software for determining the amount of time remaining before the device 139 must send the notification (and after such point in time the stored energy will be insufficient to transmit the notification). For example, knowing the capacitance used to store the energy, the voltage when the voltage began its drop, and other parameters (e.g., age of capacitor), the access device 139 can determine the point in time (referred to herein as "the point of no return") that the message must be sent. The access device 139 can then monitor the voltage to determine if the voltage recovers (goes back up). If the voltage recovers before the point of no return, the access device need not transmit a notification but instead may transmit an alert and/or data concerning the voltage drop. If the voltage does not recover before the point of no return, the notification is transmitted.

In some embodiments, the device 137 may have a battery as a back-up power source. In another embodiment, a capacitor 211 (see FIG. 8) or other short term power storage device may be included in the device 137. For example, during normal operations, the device 137 may be powered from power received from the LV power line 114. The capacitor 211 or other storage device may be charged from the received power. In the event that the supply of power stops, the capacitor 211 may discharge over a characteristic time period based on its capacitance value. The device 137, having lost the power signal, will use the power discharged from the capacitor 211 to transmit a "last gasp" notification upstream, thereby reporting of the power parameter distribution event before the energy of the capacitor is fully consumed and the PLCD 137 ceases operating.

In one embodiment, when the PLCD 137 detects a trigger event at step 206, the device's controller 142 may generate an interrupt, so that communication of the event may occur immediately (i.e., take priority over other processes being performed by the controller 142). For example, upon detecting a trigger event, the controller 142 may prepare and send two simple network management protocol (SNMP) traps to the power line server 118 (or other remote computer system). The SNMP is one of the protocols among the internet protocol suite. SNMP is used by network management systems to monitor network-attached devices for conditions that warrant administrative attention. The SNMP traps allow an automated agent to notify a management station of significant events. In this case the PLS 118 is being notified of a power distribution parameter event. The SNMP trap may convey information to identify and locate a power distribution event. In one embodiment, the serial number of the source device (e.g., the access device 139) from which the communication originated. Such serial number may be correlated to a pole number (and then to a location) or to a street address (e.g., by retrieving the data from a database storing such information) to determine the location of the power outage. In another embodiment the MAC address of the source device is used. The communication also may include one or more codes among a range of potential codes. For example, there may be a specific code for each reportable power distribution parameter event. A specific code may be transmitted with the SNMP trap according to the specific power distribution parameter event detected. The reported power distribution parameter event (e.g., trigger event) may be used by the PLS 118 to determine the identity of the corresponding power distribution event (e.g., fault; outage, imminent outage, etc.) and the location thereof.

In response to detection of the power distribution parameter event, the controller 142 also may prepare the device 137 for shutdown and rebooting. For example, information may be stored in non-volatile memory indicating the reasons for the shutdown and reboot. The data samples that resulted in the power distribution parameter event and shutdown also may be stored with such information. As part of the shutdown process, files may be closed and processes may be terminated even if power remains available. The device 137 need not "disconnect" itself from the power source or stop using power to shutdown as that term is used herein. After the device 137 restarts (e.g., after power is supplied), the stored information may be transmitted upstream to the power line server 118 for a more detailed analysis of the event. Thus, in one embodiment SNMP traps are transmitted immediately and a detailed communication may be transmitted after power is re-supplied and the device 137 has rebooted.

In another embodiment, a more detailed communication is sent immediately upon detection of the power distribution parameter event. Such communication may be sent instead of, or in addition to the SNMP traps. The detailed communication may include power distribution parameter data (measured and/or processed), results of the compare process, and a time stamp of when the parameter data was obtained and/or when the test result was detected. The detailed communication also may include an identification of the event, such as a specific code corresponding to a specific event. The detailed communication also may include location information for identifying the source location of the event. In various embodiments the communication may include information useful for identifying the type of event detected and the location of the sensor device 115 or power line communication device (e.g., access device 139) where the event has been detected.

Under some conditions, it may not be possible to transmit a communication in response to a detected power distribution parameter event, (e.g., when the MV current exceeds threshold). In response to such an event, the PLCD 137 may continue to monitor the power distribution parameter, and wait until the fault condition no longer exists over (e.g., MV current drops below the threshold into the normal range). Once the fault condition no longer exists, the PLCD 137 may transmit the notification to report the event. In some embodiments, the PLCD 137 first may wait a predetermined time period (e.g., 1 second) after the fault passes before transmitting the communication. In some embodiments, the PLCD 137 may first determine that a communication channel is operational (permits reliable communications) before transmitting data.

The notification (e.g., the SNMP trap and/or detailed communication) sent from the PLCD 137 (e.g., access device 139) may be transmitted upstream along an MV power line 110. For example, the communication may propagate toward a repeater 135 which repeats the communication onward toward a backhaul device 138. The backhaul device 138 then may transmit the communication to an upstream node or aggregation point 124 which communicates with a point of presence 212 for the internet 126 or another IP based network. The communication then may continue via the internet toward a power line server 118 or other processing center for the utility. In some embodiments, the path from the detecting PLCD 137 to the backhaul device 138 may be along MV power lines 110. In other embodiments, one or more links between the initial PLCD 137 and backhaul device 138 may be along fiber, cable or wireless media. The link between the backhaul device 138 and aggregation point 124 typically is via fiber, cable or wireless media. The specific path and transmission media may vary according to the embodiment. In another example scenario in which a sensor device 115 is coupled to a backhaul device 138, and the backhaul device detects the power distribution parameter event, the communication path may originate at the backhaul device 138 and be transmitted to an upstream node or to an aggregation point 124. In other embodiments, the notification may be transmitted wirelessly via a mobile telephone network, a paging network, a WiMAX network, an IEEE 802.11x (Wifi) network, or other wireless network.

Communications transmitted in response to a power distribution parameter event ultimately may reach the power line server (PLS) 118 or other computing system. The PLS 118 may receive multiple communications from multiple PLCDs affected by a common event in a given geographical area. The particular pattern of detected power distribution parameter events may be a 'signature' for a specific type of power distribution event (e.g., tripping of a switch). The data (e.g., parameter data, parameter event, location data, time of data sample, time of event detection, time of communication, etc.) may be processed to determine when and where the power distribution event is occurring (or will occur) (e.g., between what PLCDs 137 and/or utility poles). For example, if a first group of PLCDs 137 (or one device) connected to a MV power line does not detect a trigger event and a second group of PLCDs 137 (or one device) downstream and adjacent to the first group on the same MV power line do detect a trigger event, the PLS 118 or other computing device may process the notification and associated data from the second group and (based on the absence of notifications from the first group) determine that the event is occurring between the first and second groups of PLCDs 137.

The signature (i.e., the electrical characteristics) for a given power distribution event may be a characteristic pattern of power distribution parameter events over an area affected by the power distribution event. For example, a fault may propagate over an area (e.g., down an MV power line) and be detected as a series of power distribution parameter events in time sequence. A power outage may be detected by multiple PLCDs with the first PLCD to communicate the event being the device closest to the source of the power outage. A fault due to lightning may be detected first at a point closest to the strike. The impact of the lightning may propagate away from the strike point along multiple directions from the strike point and result in an expanding radius of detected power distribution parameter events.

Each power distribution parameter event notification may be logged (stored) and processed. A power distribution parameter event may be detected by different PLCDs in response to the same trigger data or different power distribution trigger data. Different PLCDs may detect different types of power distribution parameter events in response to a common power distribution event. For example, the PLS 118 may receive some communications that indicate that power line voltage dropped below a threshold value, and receive other communications that indicate that the current has exceeded a threshold value (or dropped below a threshold value). Such pattern may signify an imminent power outage for a corresponding area due to an imminent fault.

The PLS 118 may respond to a detected power distribution event to better manage power distribution within a region or area. For example, a pattern of power distribution parameter events may signify that the system is becoming unstable amidst the power demands of the consumers. The PLS 118 may detect such conditions and activate an agent to respond. For example, a communication may be sent to a remote computer or person who monitors the power distribution system to alert the person to take appropriate action. Such person (or computer) may initiate a rolling brownout to keep the power up or shut down a part of the network. In some embodiments the PLS 118 may activate an automatic agent which makes an automated response to take an appropriate action, (e.g., a rolling brownout is initiated automatically over an area determined automatically).

In some instances a PLCD 137 may be adversely affected by a given power distribution event, and be unable to transmit a notification. In such case, other PLCDs 137 may detect a power distribution parameter event and still be able to transmit a notification. Thus, the physical pattern of power distribution parameter events may include omissions of communications from one or more PLCDs 137 (which itself may comprise a trigger event to the PLS). In some instances, an event may occur downstream along an LV power subnet. The access device 139 for such subnet may detect a power distribution event even though the LV power line 114 loses power. The access device 139 may communicate such event upstream along the MV power line 110. In a scenario where the power distribution event occurs along an MV power line, PLCDs 137 downstream of the event may detect a power distribution parameter event but be unable to provide a notification to their corresponding backhaul device 138. However, PLCDs 137 upstream of the event also may detect a power distribution parameter event and be able to transmit a notification upstream to the PLS 118. In some embodiments in which the PLCD 137 has a wireless transceiver, a wireless communication may be sent. The wireless transceiver may be battery operated, or have a back-up battery power source enabling communication in the presence of a power distribution event.

Figure 9:
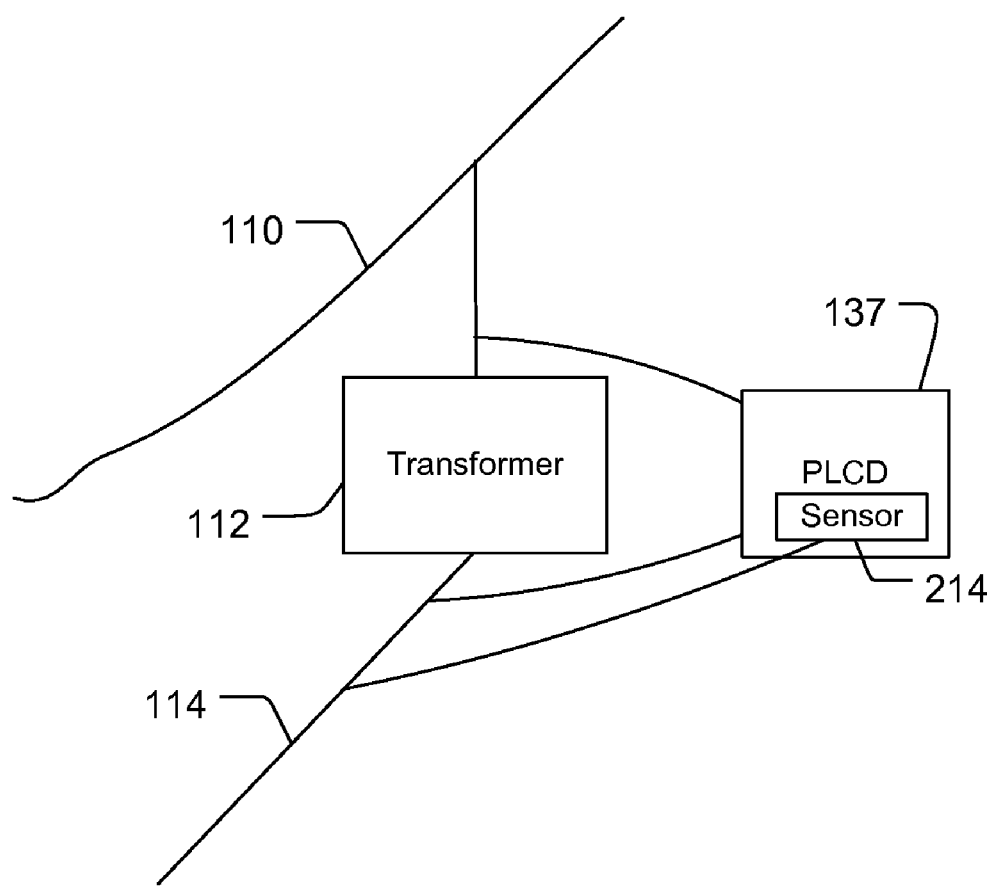
FIG. 9 illustrates a sensor device located at a power line communication device and coupled to a power line according to another example embodiment of the present invention.

FIG. 9 shows an alternative embodiment in which a line monitor sensor 214 is included in the PLCD 137. In an exemplary embodiment the line monitor sensor 214 may be, for example, the CS5461A power meter integrated circuit provided commercially by Cirrus Logic. The line monitor sensor 214 may be located at (or in the same housing as) a PLCD 137 to monitor a specific power distribution parameter. In various configurations the line monitor device 214 may measure instantaneous current and/or, instantaneous voltage, and calculate instantaneous power, real power, apparent power, $I_{RMS}$ or $V_{RMS}$. The line monitor device 214 may be coupled to the LV power line 114 via a shunt resistor (not shown), current transformer (not shown) to measure current, or via a resistive divider network (not shown) or potential transformer (not shown) to measure for voltage. The device 214 may have a single phase 2-wire connection or a single phase 3-wire connection. The device 214 may have a direct connection to the power line 114 or be isolated from the power line 114. Other sensor devices may also be used.

Figure 10:
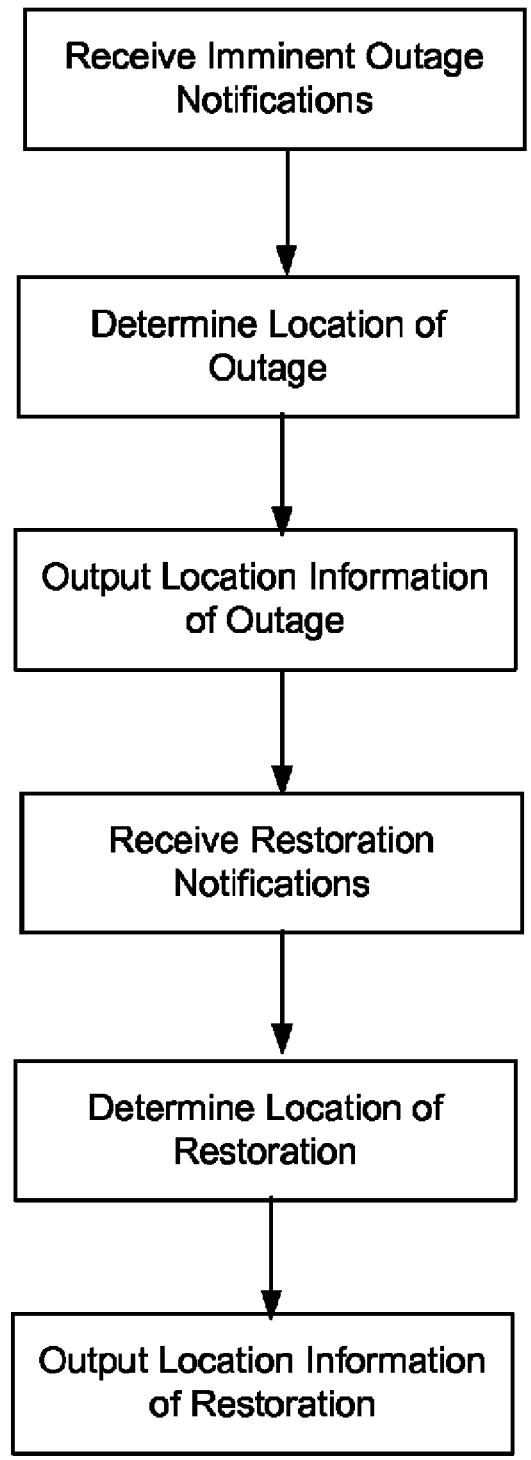
FIG. 10 illustrates a process for determining the locations of power outages and power restorations according to an example embodiment of the present invention.

Referring to FIG. 10, when the remote computer (e.g., a power line server) receives the notifications from one or more PLCDs 137, it may determine the location of the outage and map the power outage on a map that is presented on a display (including streets and power lines thereon) to allow utility personnel to easily identify the location of the fault (and what protection device(s) may have tripped and need attention). As discussed above, upon powering up the access devices 139 may access their non-volatile memory to determine if a flag bit is stored therein and if so, to transmit a live alert indicating that (1) the device is back on the network and (2) the device shut down because of a power outage. Upon receiving the live alert notifications the PLS 118 may the determine the areas where power has been restored. More specifically, the PLS may map the power restoration (show areas where power is restored in a first color), the power outage (show areas where power is out in a second color), and unaffected areas (show areas where power was not disrupted in a third color) on a map that is presented on a display (including streets and power lines thereon) to allow utility personnel to easily identify the locations of the outage and restoration (and what protection device(s) may have tripped and need attention). It is worth noting that when a nested outage occurs, the PLS may receive restoration notifications (live alerts) from only a subset of the devices that transmitted a last gasp, which may indicate that multiple faults occurred (and initial efforts to restore power did not restore the power to all locations).

The PLCDs 137 may be used to read power usage data from one or more automated meters resident at one or more customer premises. Another trigger event may be a scenario wherein a PLCD 137 loses communications with a given meter for a predetermined time period (e.g., thirty seconds), which may indicate a broken low voltage power line that causes a power outage to one or more customers. In response, the PLCD 137 may transmit a notification identifying the one or more meters with which the PLCD 137 has lost communications. The PLS 118 may use the meter identifying data to determine customer addresses for the meters (all of which may be stored in a customer database) in order to determine the location of the power outage.

After the PLCDs 137 re-establishes communications with a meter, the PLCDs 137 may transmit a notification to the PLS 118 that includes information identifying the re-acquired meter(s). The PLS 118 may then determine the location (e.g., addresses) of the power restoration by using the meter identifying information to retrieve the customer address(es). As discussed above, the power outage, power restoration, and unaffected areas may be displayed on a map and/or in a tabular form. Thus, the present invention facilitates the detection of power outage at a single customer premises.

Thus, by receiving notifications (last gasps) from one or more devices, the PLS 118 knows that a MV power line outage has occurred and by receiving a notification from a device that communication has been lost, the PLS 118 knows that a low voltage power line outage has occurred.

The notifications and storages of data may include a date and time stamp to allow the PLS 118, for example, to attribute multiple notifications to a single power event. In addition, the threshold and signature data used by the devices may be updated from transmissions from the PLS 118 or other remote computer system, which are stored in memory of the device 139.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of using a device to provide power outage information for a power distribution system that includes a low voltage power line and wherein the device receives power from the low voltage power and experiences a power loss during a local power outage, comprising:
   monitoring a voltage of the low voltage power line;
   detecting a voltage reduction below a threshold voltage for a predetermined time period;
   storing information of the voltage reduction in a non-volatile memory prior to the power outage; and
   transmitting a notification of said detecting to a remote computer system.

2. The method of claim 1, further comprising:
   providing a source of stored energy; and
   wherein said transmitting is performed via use of the stored energy when power to the device from the power line is insufficient for operation of the device.

3. The method of claim 1, further comprising shutting down operation in response to said detecting the voltage reduction.

4. The method of claim 1, wherein said notification includes information sufficient for determining a location of the voltage reduction.

5. The method of claim 1, wherein said monitoring comprises determining a moving window trailing average of the voltage.

6. The method of claim 1, wherein said monitoring comprises:
   making a plurality of measurements of the voltage during a time interval; and
   averaging the plurality of voltage measurements.

7. The method of claim 6, wherein the time interval moves over time.

8. The method of claim 1, further comprising transmitting a second notification to the remote computer system when power is restored after the power outage.

9. The method of claim 8, wherein the second notification includes information of the voltage reduction stored in the non-volatile memory.

10. The method of claim 1, further comprising:
    providing a capacitor to store energy; and
    wherein said transmitting is performed via use of the stored energy when power to the device from the power line is insufficient for operation of the device.

11. The method of claim 1, wherein the device does not include a source of stored energy for said transmitting.

12. The method of claim 1, wherein the voltage reduction is indicative of a power outage,
    wherein said transmitting the notification occurs after a power restoration; and
    wherein the notification includes data based on the information stored in the non-volatile memory.

13. The method of claim 1, further comprising when power is restored after the power outage:
    accessing the non-volatile memory to retrieve the information; and
    transmitting a second notification to the remote computer system that includes data based on the retrieved information.

14. A method of using a device to provide information about a power distribution system that includes a power line that carries a nominal voltage and that provides operating power to the device, comprising:
    monitoring a voltage of the power line;
    detecting a voltage reduction below a threshold value and wherein the voltage reduction drops to substantially zero;
    determining that the voltage remains below the threshold value for a predetermined time period; and
    transmitting a first notification if the voltage remains below the threshold value for a predetermined time period.

15. The method of claim 14, wherein said monitoring comprises determining a moving window trailing average for the voltage.

16. The method of claim 14, wherein said monitoring comprises measuring the instantaneous voltage.

17. The method of claim 14, further comprising:
    providing a source of stored energy; and
    wherein said transmitting is performed via use of the stored energy when power to the device from the power line is insufficient for operation of the device.

18. The method of claim 14, further comprising executing a shut down operation in response to said determining.

19. The method of claim 14, wherein said first notification includes information sufficient for determining a location of the voltage reduction.

20. The method of claim 14, wherein said monitoring comprises:
    making a plurality of measurements of the voltage during a time interval; and
    averaging the plurality of voltage measurements.

21. The method of claim 20, wherein the time interval moves over time.

22. The method of claim 14, wherein the voltage dropping to substantially zero comprises a power outage, the method further comprising transmitting a second notification when power is restored after the power outage.

23. The method of claim 22, further comprising:
    storing information of the voltage reduction in a non-volatile memory prior to the power outage; and
    wherein the second notification includes data based on the information of the voltage reduction stored in the non-volatile memory.

24. A device for providing information about a power outage of a power distribution system that includes a plurality of power lines, the device comprising:
- a circuit configured to measure a voltage a power line;
- a power supply configured to receive power from the power line;
- a non-volatile memory;
- a processor in communication with said non-volatile memory and said circuit and configured to receive voltage data based on measurements of the voltage from said circuit;
- a communication interface in communication with said processor;
- wherein said processor is configured to process voltage data to detect a voltage reduction below a threshold voltage for a predetermined time period;
- wherein said processor is configured to store first information of the voltage reduction in said non-volatile memory; and
- wherein said processor is configured to cause said communication interface to transmit a notification to a remote computer system in response to detecting a voltage reduction below the threshold voltage for the predetermined time period.

25. The device of claim 24, wherein said processor is configured:
- to access said non-volatile memory upon power up; and
- if the first information is stored in said non-volatile memory; to transmit a second notification to the remote computer system that includes data based on the first information.

* * * * *